US009200655B2

(12) United States Patent
Pan

(10) Patent No.: US 9,200,655 B2
(45) Date of Patent: Dec. 1, 2015

(54) POLE SECUREMENT SLEEVE AND AN UMBRELLA BASE ASSEMBLY INCLUDING THE SAME

(71) Applicant: Sunjoy Industries Group Ltd., Steubenville, OH (US)

(72) Inventor: Lianzhang Pan, Huzhou (CN)

(73) Assignee: Sunjoy Industries Group Ltd., Steubenville, OH (US)

( * ) Notice: Subject to any disclaimer, the term of this patent is extended or adjusted under 35 U.S.C. 154(b) by 161 days.

(21) Appl. No.: 14/011,633

(22) Filed: Aug. 27, 2013

(65) Prior Publication Data

US 2015/0060631 A1    Mar. 5, 2015

(51) Int. Cl.
*F16M 11/28* (2006.01)
*F16B 9/02* (2006.01)
(Continued)

(52) U.S. Cl.
CPC ............... *F16B 9/023* (2013.01); *A45B 25/00* (2013.01); *E04H 12/22* (2013.01); *E04H 12/2238* (2013.01); *A45B 2025/003* (2013.01)

(58) Field of Classification Search
CPC ............ F16M 2200/027; F16M 11/28; Y10T 403/535; Y10T 403/32426; F16B 7/1418
USPC ........... 403/289, 290, 109.1, 109.2, 377, 378, 403/373; 248/157, 423, 411, 413, 161, 121, 248/122.1, 125.1, 125.2, 125.8
See application file for complete search history.

(56) References Cited

U.S. PATENT DOCUMENTS 2,503,738 A * 4/1950 Horton .......................... 403/362
4,010,926 A * 3/1977 Carnahan ...................... 248/411
(Continued)

FOREIGN PATENT DOCUMENTS

CA       2423742 A1    6/2004
CN     201066026 Y     5/2008
(Continued)

OTHER PUBLICATIONS

Umbrella Bases and Stands, ePatioUmbrellas.com Website, Web page <http://www.epatioumbrellas.com/umbrella_stands_bases.html>, 3 pages, dated Dec. 28, 2011, retrieved from Internet Archive Wayback Machine <https://web.archive.org/web/20111228062715/http://www.epatioumbrellas.com/umbrella_stands_bases.html> on Feb. 24, 2015.

(Continued)

*Primary Examiner* — Jeanette E Chapman
*Assistant Examiner* — Daniel Kenny
(74) *Attorney, Agent, or Firm* — The Law Office of Patrick F. O'Reilly III, LLC

(57) ABSTRACT

A pole securement sleeve is disclosed herein. The pole securement sleeve includes a tubular housing member having a sidewall defining an internal passageway configured to receive a pole therein; a clamping member, a portion of the clamping member disposed in the internal passageway of the tubular housing member, the clamping member configured to apply a compressive force about a portion of an outer periphery of the pole; and a clamping member adjustment means operatively coupled to the clamping member, the clamping member adjustment means together with the clamping member circumscribing an area configured to be intersected by the pole. When a moment or torque is applied to the clamping member adjustment means, a size of the area circumscribed by the clamping member adjustment means and the clamping member is adjusted. A pole securement system and an umbrella base assembly, each including the pole securement sleeve, are also disclosed herein.

20 Claims, 8 Drawing Sheets

(51) Int. Cl.
*A45B 25/00* (2006.01)
*E04H 12/22* (2006.01)

(56) References Cited

U.S. PATENT DOCUMENTS

| | | | | |
|---|---|---|---|---|
| 4,111,575 | A | * | 9/1978 | Hoshino ........................ 403/104 |
| 4,858,860 | A | * | 8/1989 | Richards ........................ 248/62 |
| 7,784,761 | B2 | | 8/2010 | Ma |
| 8,402,981 | B2 | * | 3/2013 | Liu ............................. 135/20.3 |
| 2013/0146739 | A1 | * | 6/2013 | Zhao ............................. 248/519 |

FOREIGN PATENT DOCUMENTS

| | | |
|---|---|---|
| CN | 201925692 U | 8/2011 |
| CN | 202452062 U | 9/2012 |
| WO | 2004/101915 A1 | 11/2004 |

OTHER PUBLICATIONS

Instruction Manual for Renaissance Umbrella Base, manufactured by Sunjoy Industries, pp. 1-3, dated Jun. 2011.

* cited by examiner

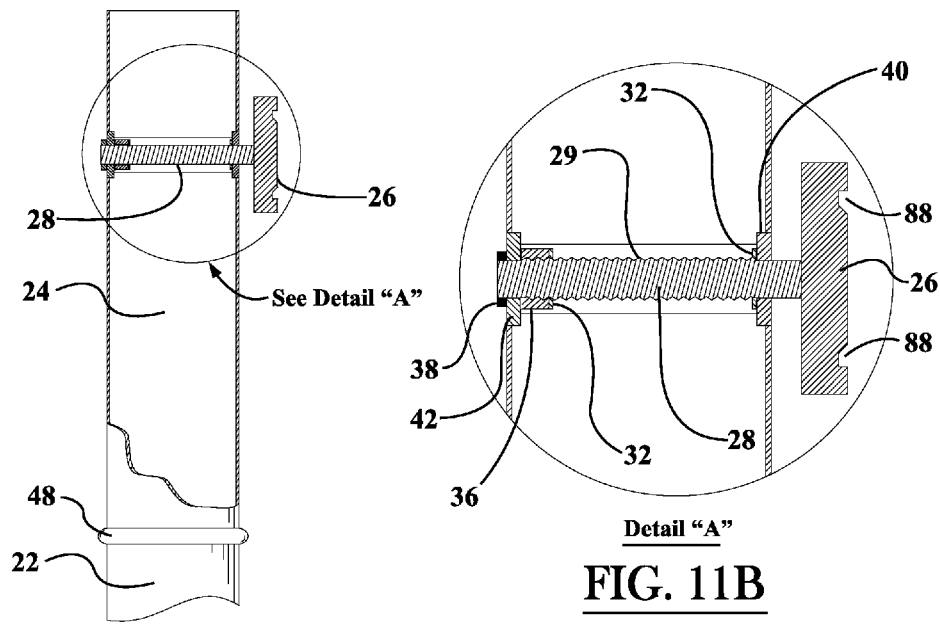
FIG. 11A
FIG. 11B
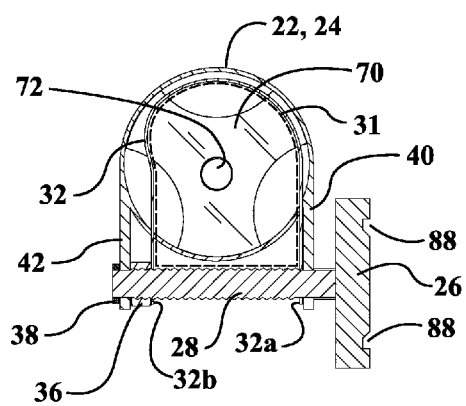
FIG. 12

POLE SECUREMENT SLEEVE AND AN UMBRELLA BASE ASSEMBLY INCLUDING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a securement sleeve for a pole. More particularly, in some embodiments, the invention relates to securement sleeve for an umbrella pole that is provided as part of an umbrella base assembly.

2. Background and Description of Related Art

Tables designed for outdoor use often include an umbrella in order to shade the occupants sitting therearound from the sunlight. Because the canopy portions of these umbrellas typically have a large concave surface area, which tends to "cup" the wind blowing thereagainst, these umbrellas frequently become disengaged from their support assemblies. After becoming separated from their support assemblies, the umbrellas are often violently tossed around by the force of the wind acting thereon. Consequently, as a result of being freely blown around by the wind, the umbrellas are typically damaged, or in some cases, even destroyed beyond repair. In such cases, the owner of the damaged or destroyed umbrella has no choice but to incur the cost of repairing or replacing the umbrella.

Outdoor umbrellas typically become disengaged from their support assemblies because these assemblies do not include adequate means for retaining the shaft or pole of the umbrella therein. That is, these conventional support assemblies use engagement means for the umbrella pole or shaft that are unable to counter the high wind forces exerted on the umbrella canopy portion. As such, when the wind force exerted on the umbrella canopy portion exceeds the holding force of support assembly engagement means, the umbrella becomes separated from its support assembly, and it is free to be blown around by the wind.

Therefore, what is needed is a pole securement sleeve that is capable of securely retaining a pole therein so as to effectively resist external forces acting on the pole. Also, a pole securement system is needed that employs a pole securement sleeve which is capable of exerting a substantial retaining force on the pole so as to ensure that it does not become disengaged from the securement sleeve. In addition, an umbrella base assembly is needed that uses a pole securement sleeve which is capable of exerting a force on the umbrella pole which is sufficient to prevent the umbrella pole from becoming separated from the umbrella base assembly.

BRIEF SUMMARY OF EMBODIMENTS OF THE INVENTION

Accordingly, the present invention is directed to a pole securement sleeve and an umbrella base assembly including the same that substantially obviates one or more problems resulting from the limitations and deficiencies of the related art.

In accordance with one or more embodiments of the present invention, there is provided a pole securement sleeve that includes: a tubular housing member having a sidewall defining an internal passageway, the internal passageway of the tubular housing member configured to receive a pole therein; a clamping member, a portion of the clamping member disposed in the internal passageway of the tubular housing member, the clamping member configured to apply a compressive force about a portion of an outer periphery of the pole; and a clamping member adjustment means operatively coupled to the clamping member, the clamping member adjustment means together with the clamping member circumscribing an area configured to be intersected by the pole. In these one or more embodiments, when a moment or torque is applied to the clamping member adjustment means, a size of the area circumscribed by the clamping member adjustment means and the clamping member is adjusted.

In a further embodiment of the present invention, the tubular housing member comprises a slot disposed in the sidewall thereof, the clamping member passing through the slot in the sidewall of the tubular housing member.

In yet a further embodiment, the pole securement sleeve further comprises a pair of spaced apart support arms extending from the sidewall of the tubular housing member, the pair of support arms supporting the clamping member adjustment means in a cantilevered manner from the sidewall of the tubular housing member.

In still a further embodiment, the clamping member is in the form of a U-shaped member, the U-shaped member having a first end and a second end, the first end of the U-shaped member being in a substantially fixed position relative to the clamping member adjustment means, and the second end of the U-shaped member being adjustable relative to the clamping member adjustment means so as to increase or decrease the area circumscribed by the clamping member adjustment means and the clamping member.

In yet a further embodiment, the second end of the U-shaped member is linearly displaceable along a longitudinal axis of the clamping member adjustment means.

In still a further embodiment, the clamping member adjustment means comprises a screw having a plurality of external threads that matingly engage with a plurality of internal threads of the clamping member.

In yet a further embodiment, the clamping member adjustment means further comprises a handle portion, the handle portion coupled to an end portion of the screw.

In still a further embodiment, the pole securement sleeve further comprises a housing member substantially covering the clamping member adjustment means.

In accordance with one or more other embodiments of the present invention, there is provided a pole securement system that includes: a pole having a first end portion and a second end portion, the second end portion of the pole disposed opposite to the first end portion; a tubular housing member having a sidewall defining an internal passageway, the internal passageway of the tubular housing member configured to receive the first end portion of the pole therein; and at least one clamping mechanism coupled to the tubular housing member. The at least one clamping mechanism includes: a clamping member, a portion of the clamping member disposed in the internal passageway of the tubular housing member, the clamping member configured to apply a compressive force about a portion of an outer periphery of the pole; and a clamping member adjustment means operatively coupled to the clamping member, the clamping member adjustment means together with the clamping member circumscribing an area intersected by the pole. In these one or more embodiments, when a moment or torque is applied to the clamping member adjustment means, a size of the area circumscribed by the clamping member adjustment means and the clamping member is adjusted, and a compressive force is applied to the portion of the outer periphery of the pole.

In a further embodiment of the present invention, the at least one clamping mechanism comprises a pair of the clamping mechanisms, a first of the pair of the clamp mechanisms axially spaced apart from a second of the pair of the clamp mechanisms along a length of the tubular housing member.

In yet a further embodiment, the tubular housing member comprises a first tubular member section and a second tubular member section, the second tubular member section comprising an end portion with a plurality of external threads disposed thereon, the plurality of external threads on the end portion of the second tubular member section configured to engage with an internal surface of an end portion of the first tubular member section.

In still a further embodiment, the first of the pair of the clamping mechanisms is coupled to the first tubular member section, and the second of the pair of the clamp mechanisms is coupled to the second tubular member section.

In accordance with yet one or more other embodiments of the present invention, there is provided an umbrella base assembly configured to support an umbrella pole in an upright position, which includes an umbrella base member and a pole securement sleeve coupled to the umbrella base member. The pole securement sleeve includes: a tubular housing member having a sidewall defining an internal passageway, the internal passageway of the tubular housing member configured to receive an umbrella pole therein; a clamping member, a portion of the clamping member disposed in the internal passageway of the tubular housing member, the clamping member configured to apply a compressive force about a portion of an outer periphery of the umbrella pole; and a clamping member adjustment means operatively coupled to the clamping member, the clamping member adjustment means together with the clamping member circumscribing an area configured to be intersected by the umbrella pole. In these one or more embodiments, when a moment or torque is applied to the clamping member adjustment means, a size of the area circumscribed by the clamping member adjustment means and the clamping member is adjusted.

In a further embodiment of the present invention, the umbrella base member is coupled to the pole securement sleeve by a removable fastener.

In yet a further embodiment, the pole securement sleeve of the umbrella base assembly further comprises one or more end cap members, the one or more end cap members configured to be received within an upper end portion of the tubular housing member.

In still a further embodiment, the pole securement sleeve of the umbrella base assembly further comprises a pair of spaced apart support arms extending from the sidewall of the tubular housing member, the pair of support arms supporting the clamping member adjustment means in a cantilevered manner from the sidewall of the tubular housing member.

In yet a further embodiment, the clamping member is in the form of a U-shaped member, the U-shaped member having a first end and a second end, the first end of the U-shaped member being in a substantially fixed position relative to the clamping member adjustment means, and the second end of the U-shaped member being adjustable relative to the clamping member adjustment means so as to increase or decrease the area circumscribed by the clamping member adjustment means and the clamping member.

In still a further embodiment, the second end of the U-shaped member is linearly displaceable along a longitudinal axis of the clamping member adjustment means.

In yet a further embodiment, the clamping member adjustment means comprises a screw having a plurality of external threads that matingly engage with a plurality of internal threads of the clamping member.

In still a further embodiment, the clamping member adjustment means further comprises a handle portion, the handle portion coupled to an end portion of the screw.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which:

FIG. 11A is a partial cutaway side view of the pole securement sleeve, according to an embodiment of the invention, wherein the section is cut in a generally longitudinal direction of the pole securement sleeve;

FIG. 11B is an enlarged, partial sectional view of the encircled portion of FIG. 11A (Detail A), which illustrates the clamping mechanism in detail, according to an embodiment of the invention;

FIG. 12 is a transverse sectional view of the pole securement sleeve, according to an embodiment of the invention, wherein the section is cut along the cutting-plane line A-A in FIG. 1, and the clamping mechanism housing cover has been removed.

Throughout the figures, the same parts are always denoted using the same reference characters so that, as a general rule, they will only be described once.

DETAILED DESCRIPTION OF EMBODIMENTS OF THE INVENTION

Figure 1:
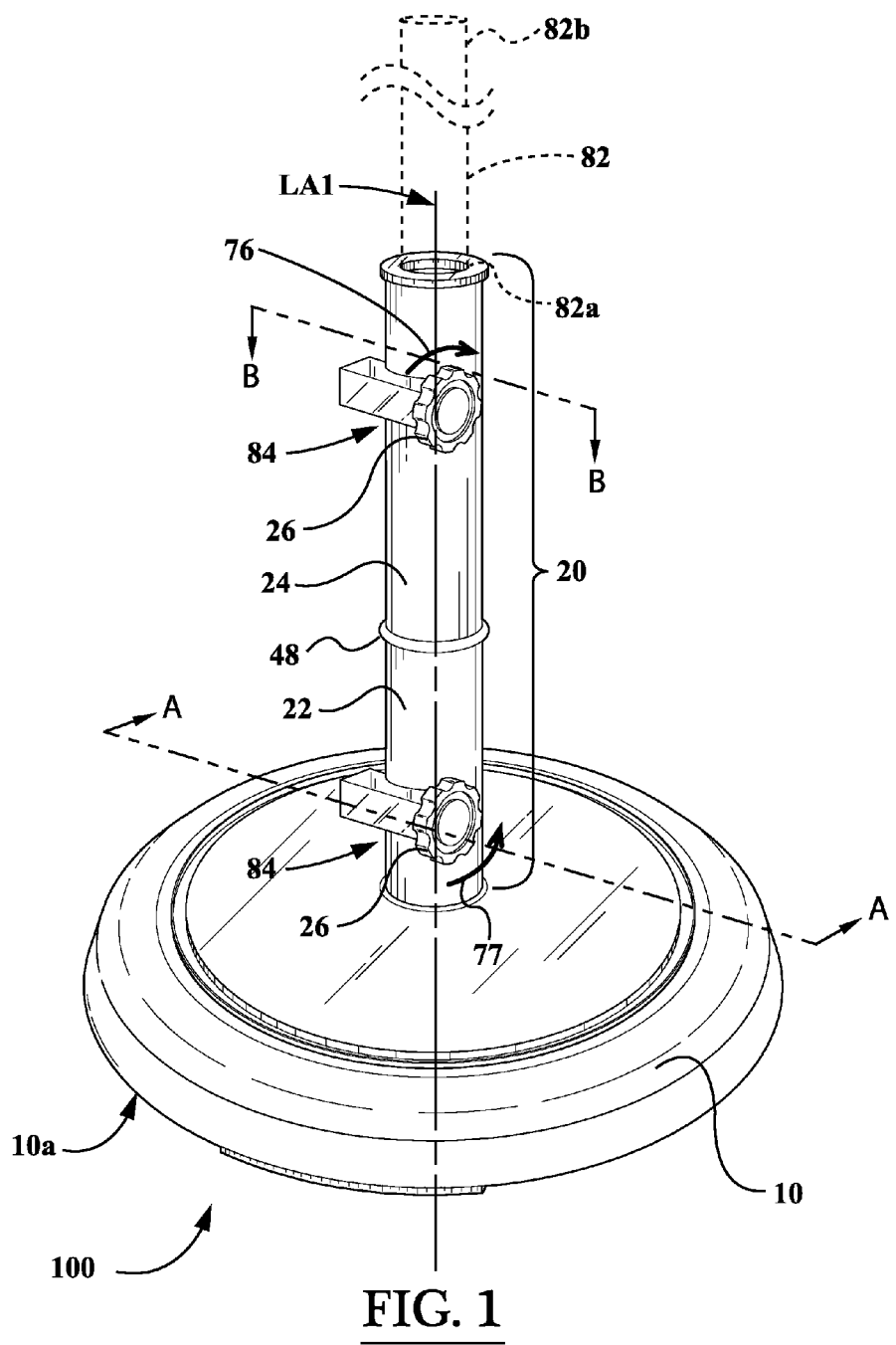
FIG. 1 is a perspective view of an umbrella base assembly, according to an embodiment of the invention.
Figure 13:
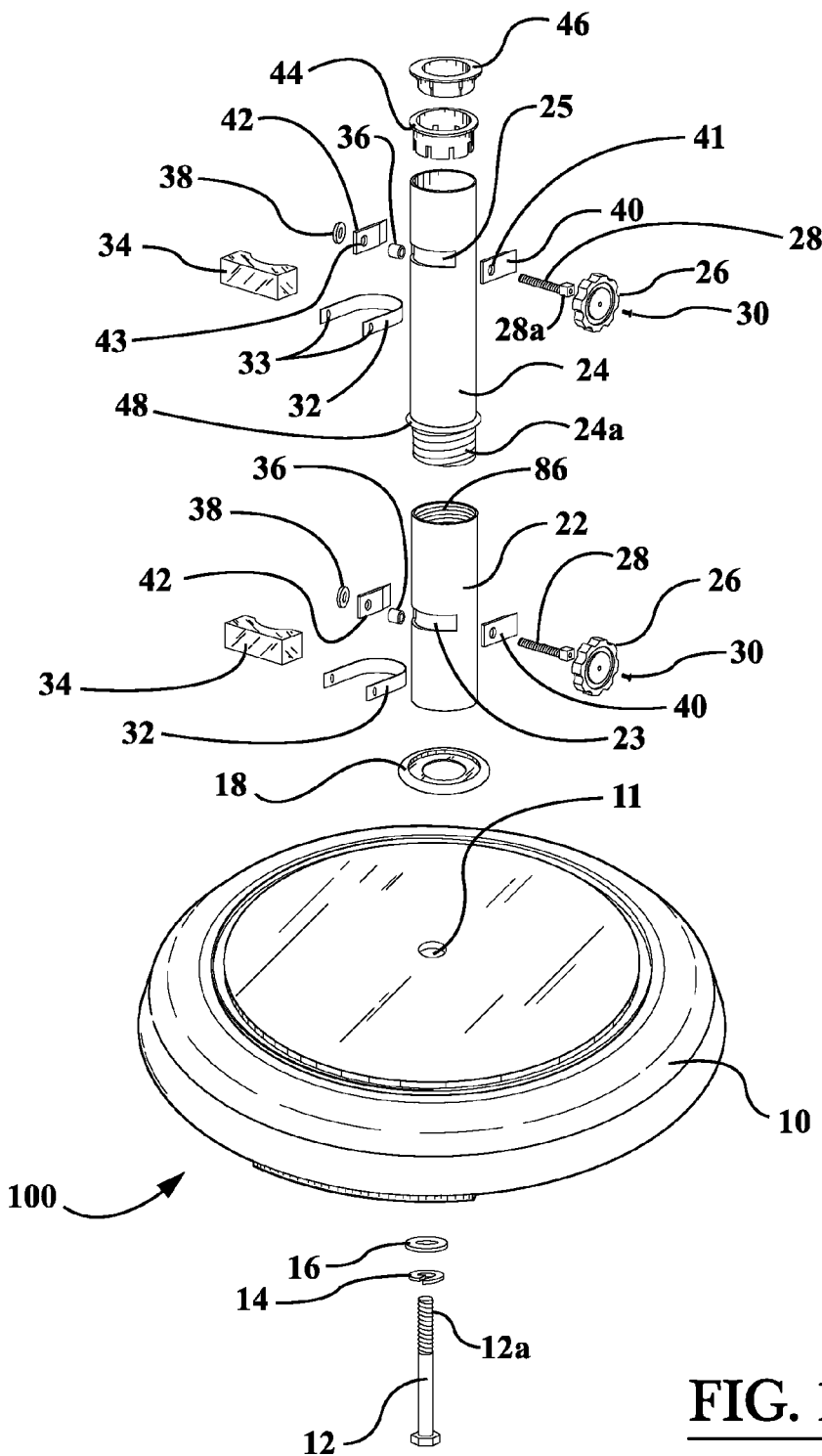
FIG. 13 is an exploded perspective view of the umbrella base assembly, according to an embodiment of the invention.

An embodiment of an umbrella base assembly is seen generally at 100 in FIGS. 1 and 13. As illustrated in the assembled perspective view of FIG. 1, it can be seen that the umbrella base assembly 100 generally comprises an umbrella base member 10 that is attached to an upright pole securement sleeve 20. As shown in FIG. 1, the longitudinal axis LA1 of the pole securement sleeve 20 is disposed generally perpendicular to the generally planar bottom surface of the umbrella base member 10. In the illustrated embodiment, with reference to the exploded view of FIG. 13, it can be seen that the umbrella base member 10 is securely coupled to the pole securement sleeve 20 by means of a removable fastener, namely a removable hex bolt 12. The shaft of the hex bolt 12 passes through the aperture 11 in the umbrella base member 10. In FIG. 13, it can be seen that the removable hex bolt 12 comprises a threaded end portion 12a with a plurality of external threads that matingly engages with the threaded aperture 72 in the base plate 70 of the pole securement sleeve 20 (refer to FIG. 12). The threaded aperture 72 in the base plate 70 contains a plurality of internal threads that mating engage with the plurality of external threads on the threaded end portion 12a of the hex bolt 12. Also, in FIG. 13, it can be seen that a lock washer 14 and flat washer 16 are provided on the shaft of the hex bolt 12. The lock washer 14 helps to prevent the hex bolt 12 from becoming inadvertently disengaged from the base plate 70 of the pole securement sleeve 20.

Figure 2:
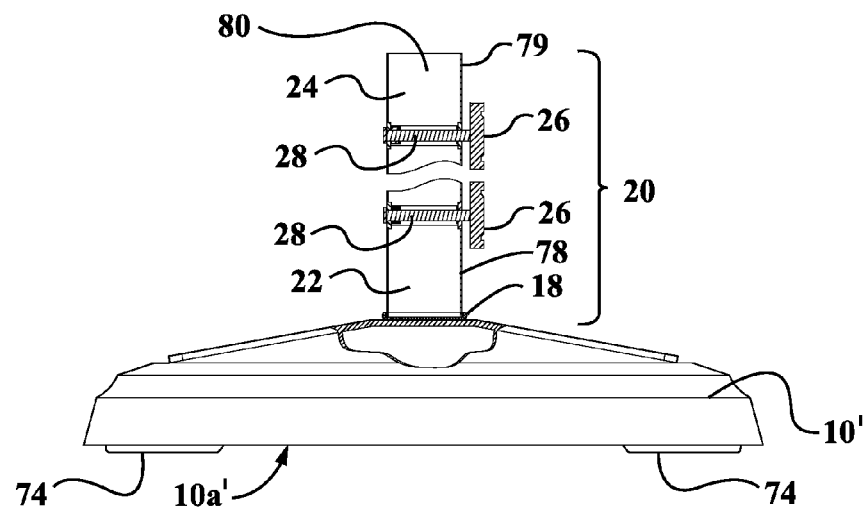
FIG. 2 is a partial cutaway side view of the umbrella base assembly with a modified umbrella base member, according to an embodiment of the invention, wherein the section is generally cut along the cutting-plane line B-B in FIG. 1.
Figure 3:
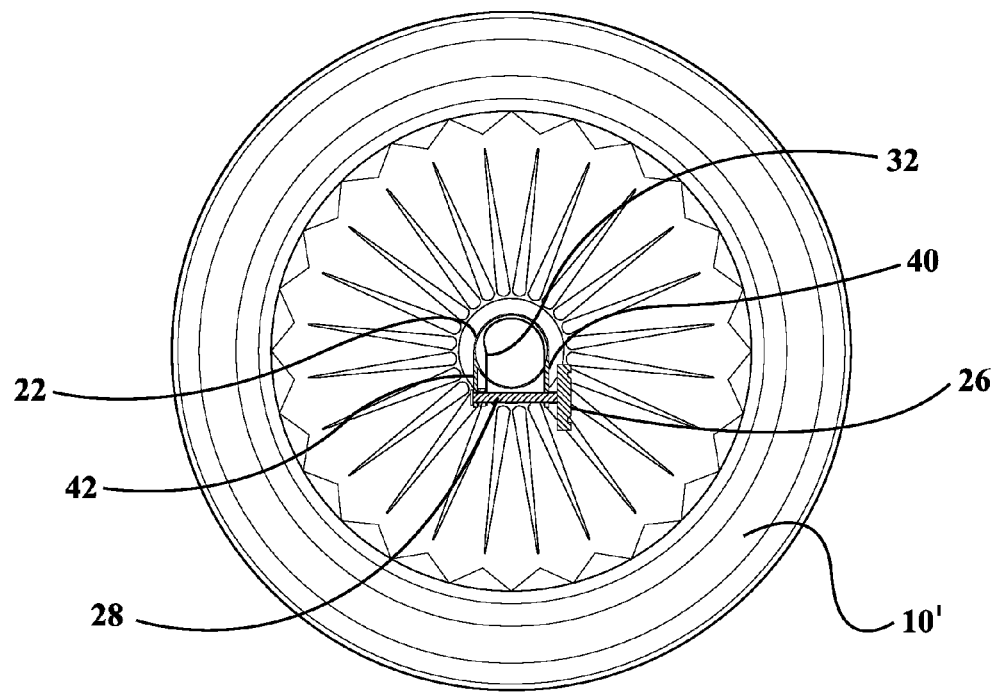
FIG. 3 is a top, transverse sectional view of the umbrella base assembly with a modified umbrella base member, according to an embodiment of the invention, wherein the section is cut along the cutting-plane line A-A in FIG. 1, and the clamping mechanism housing cover has been removed.
Figure 4:
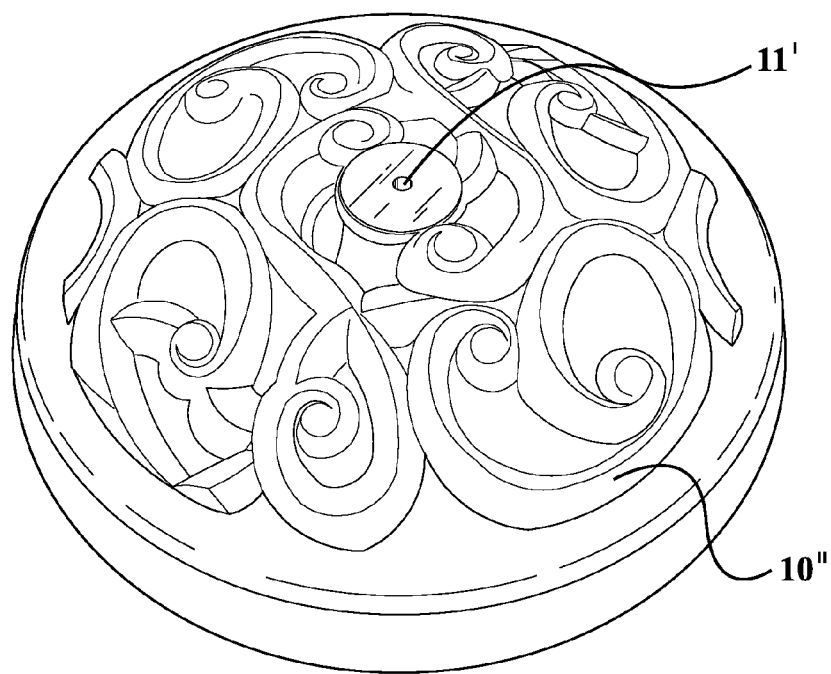
FIG. 4 is a perspective view of another umbrella base member utilized in conjunction with the umbrella base assembly, according to an embodiment of the invention.

Alternative umbrella base member designs 10', 10" are illustrated in FIGS. 2-3 and FIG. 4, respectively. As shown in FIGS. 2 and 3, the top portion of the umbrella base member 10' may be conically-shaped with a plurality of radially extending ribs spaced-apart in a circumferential pattern on the top surface thereof. Also, as shown in FIG. 2, the umbrella base member 10' may be provided with a plurality of feet 74 disposed on the bottom surface 10a' thereof. Turning to FIG. 4, it can be seen that the umbrella base member 10" is provided with a floral-type design on the top surface thereof. Like the umbrella base members 10 and 10', the umbrella base member 10" is provided with an aperture 11' disposed in the approximate center thereof for receiving the shaft of the hex bolt 12.

Figure 8:
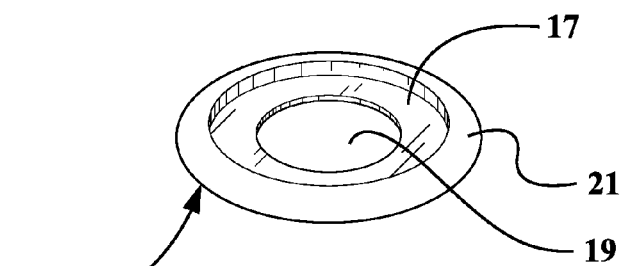
FIG. 8 is a perspective view of a washer of the umbrella base assembly that is disposed between the umbrella base member and the pole securement sleeve, according to an embodiment of the invention.

With reference to FIGS. 2 and 13, it can be seen that a washer 18 is provided between the base of the pole securement sleeve 20 and the top surface of the umbrella base member 10 (i.e., the washer 18 is sandwiched between the bottom surface of the lower tubular housing member 22 of the pole securement sleeve 20 and the top surface of the umbrella base member 10). The details of the washer 18 are best illustrated in FIG. 8. As shown in FIG. 8, the washer 18 comprises a central recess 17 for receiving the end portion of the lower tubular housing member 22. When the washer 18 is matingly engaged with the end portion of the lower tubular housing member 22, a peripheral collar 21 of the washer 18 circumscribes the outer periphery of the end portion of the lower tubular housing member 22 (see e.g., FIGS. 1 and 2). Also, as depicted in FIG. 8, the washer 18 comprises a central aperture 19 for accommodating the shaft of the hex bolt 12, which passes therethrough. In one or more embodiments, the washer 18 is formed from a polymeric material or a plastic. However, it is to be understood that other suitable materials may be used for the washer 18 as well, such as metals (e.g., aluminum or stainless steel) or composites.

Now, with reference initially to FIGS. 1, 2, and 13, the pole securement sleeve 20 of the umbrella base assembly 100 will be described in detail. As illustrated in these figures, the pole securement sleeve 20 generally includes: (i) a tubular housing member (formed by tubular sections 22, 24) having a sidewall (i.e., respective circular sidewalls 78, 79—FIG. 2) defining an internal passageway 80, the internal passageway 80 of the tubular housing member 22, 24 being configured to receive a first end portion 82a of a umbrella pole 82 therein; and (ii) at least one clamping mechanism 84 (see FIG. 1) coupled to the tubular housing member 22, 24, the at least one clamping mechanism 84 configured to apply a compressive force against an outer sidewall of the umbrella pole 82 so as to retain the umbrella pole 82 in the umbrella base assembly 100. The umbrella pole 82 has a first end portion 82a, which is received within the internal passageway 80 of the pole securement sleeve 20, and a second end portion 82b (see FIG. 1). The second end portion 82b of the umbrella pole 82 is disposed opposite to the first end portion 82a thereof. In the illustrated embodiment, it can be seen that the tubular housing member comprises a first tubular member section (i.e., lower tubular member 22) and a second tubular member section (i.e., upper tubular member 24). As best shown in the exploded view of FIG. 13, the second tubular member section 24 comprises a threaded end portion 24a with a plurality of external threads disposed thereon. The plurality of external threads on the threaded end portion 24a of the second tubular member section 24 is configured to engage with a threaded internal surface 86 of an end portion of the first tubular member section 22. As illustrated in FIGS. 1 and 13, the second tubular member section 24 is provided with a collar portion 48 just above its threaded end portion 24a for acting as an abutment against which the upper end of the first tubular member section 22 may come to rest after being connected to the second tubular member section 24.

As shown in FIGS. 1, 2, and 13, the illustrated embodiment of the invention comprises a pair of clamping mechanisms 84. The first of the pair of clamping mechanisms (i.e., lower clamping mechanism 84) is coupled to the first tubular member section 22, while the second of the pair of clamp mechanisms (i.e., upper clamping mechanism 84) is coupled to the second tubular member section 24. The lower clamping mechanism 84 is axially spaced apart from upper clamping mechanism 84 along a length of the tubular housing member 22, 24 (i.e., in a direction along the length of the longitudinal axis LA1).

Referring initially to FIGS. 1, 2, 12, and 13, it can be seen that each clamping mechanism 84 generally includes a U-shaped clamping member 32 and a clamping member adjustment means 26, 28 that is operatively coupled to the U-shaped clamping member 32. As shown in FIGS. 2 and 5-7, a portion of the U-shaped clamping member 32 is disposed in the internal passageway 80 of the tubular housing member 22, 24. The U-shaped clamping member 32 applies a compressive force about a portion of an outer periphery of the umbrella pole 82. Also, the screw 28 of the clamping member adjustment means 26, 28 together with the U-shaped clamping member 32 circumscribes an area 31 (see FIG. 12) intersected by the umbrella pole 82. When a moment or torque is applied to the handle 26 of the clamping member adjustment means 26, 28, a size of the area 31 circumscribed by the clamping member adjustment means 28 and the U-shaped clamping member 32 is adjusted (e.g., decreased), and a compressive force is applied to the portion of the outer periphery of the umbrella pole 82.

Each of first and second tubular member sections 22, 24 comprises a respective slot 23, 25 in a respective sidewall 78, 79 thereof (refer to FIG. 13). The U-shaped clamping members 32 pass through the respective slots 23, 25 in the respective sidewalls 78, 79 of the first and second tubular member sections 22, 24. Each clamping mechanism 84 is supported from its respective tubular member section 22, 24 by a respective pair of spaced apart support arms 40, 42 extending from the respective sidewall 78, 79 of the respective tubular member section 22, 24 (see FIGS. 5-7, 11B, 12, and 13). The pair of support arms 40, 42 structurally support the clamping member adjustment means (i.e., adjustment screw 28) of the clamping mechanism 84 in a cantilevered manner from the respective sidewall 78, 79 of the respective tubular member section 22, 24.

In order to facilitate the turning of the adjustment screw 28 of each clamping mechanism 84, a handle 26 is provided on an end portion of each adjustment screw 28 (see FIGS. 1 and 2). In particular, each handle 26 is received by a respective squared end portion 28a of a respective adjustment screw 28 to which it is engaged (see FIG. 13). That is, the squared end portion 28a of each screw 28 is received within a square-shaped recess in the back surface of each handle 26. As shown in the exploded view of FIG. 13, each handle 26 is secured to its respective adjustment screw 28 by means of a small handle screw 30. To help ensure that a user maintains a secure grip on each handle 26, the handles 26 are each provided with a plurality of notches 27 spaced apart about respective outer peripheries thereof. The handles 26 are also each provided with respective annular grooves 88 in the respective front surfaces thereof. In one or more embodiments, each handle 26 is formed from a polymeric material or a plastic. However, it is to be understood that other suitable materials may be used for the handles 26 as well, such as metals (e.g., aluminum or stainless steel) or composites.

Figure 5:
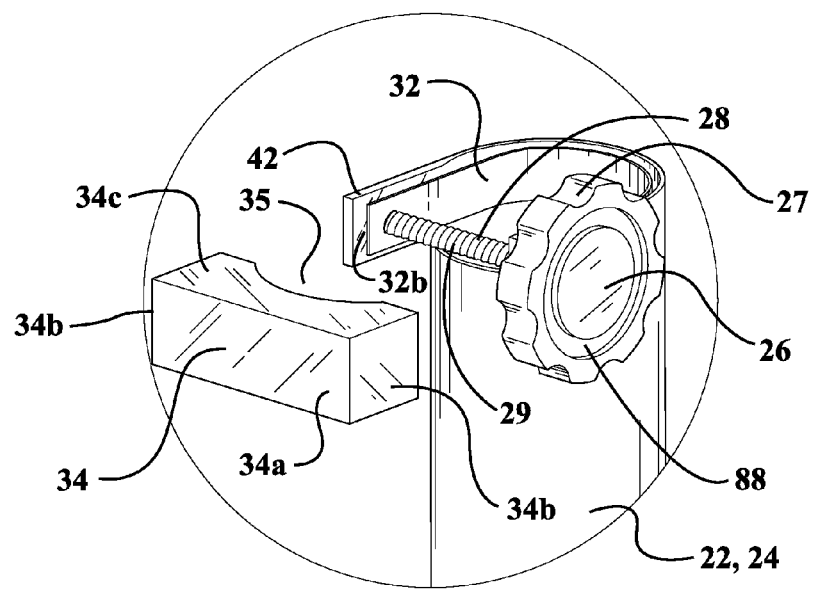
FIG. 5 is a partially exploded perspective view of a pole securement sleeve, according to an embodiment of the invention, wherein the clamping mechanism housing cover is shown separated from the other clamping mechanism components, and the clamping member is illustrated in a first position.
Figure 6:
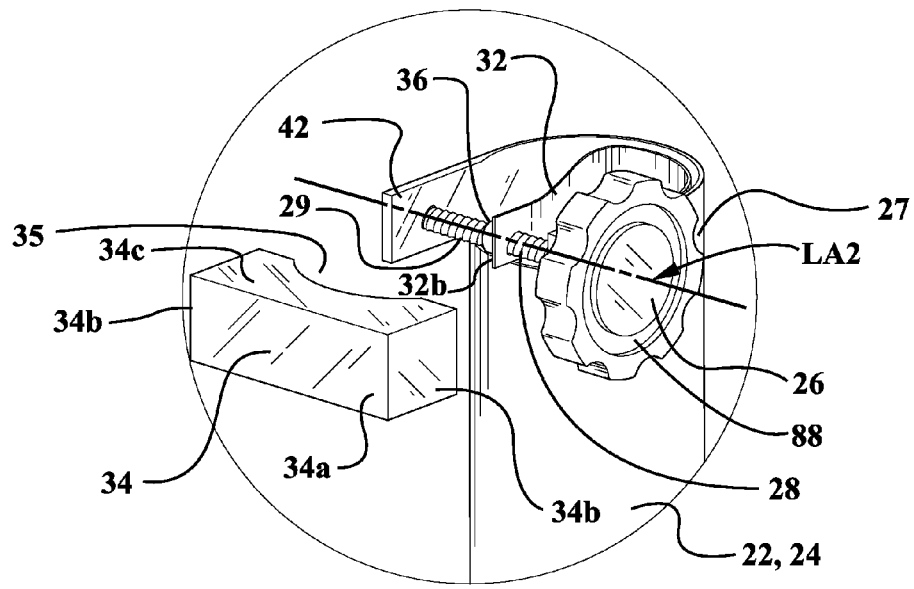
FIG. 6 is a partially exploded perspective view of the pole securement sleeve, according to an embodiment of the invention, wherein the clamping mechanism housing cover is shown separated from the other clamping mechanism components, and the clamping member is illustrated in a second position.
Figure 7:
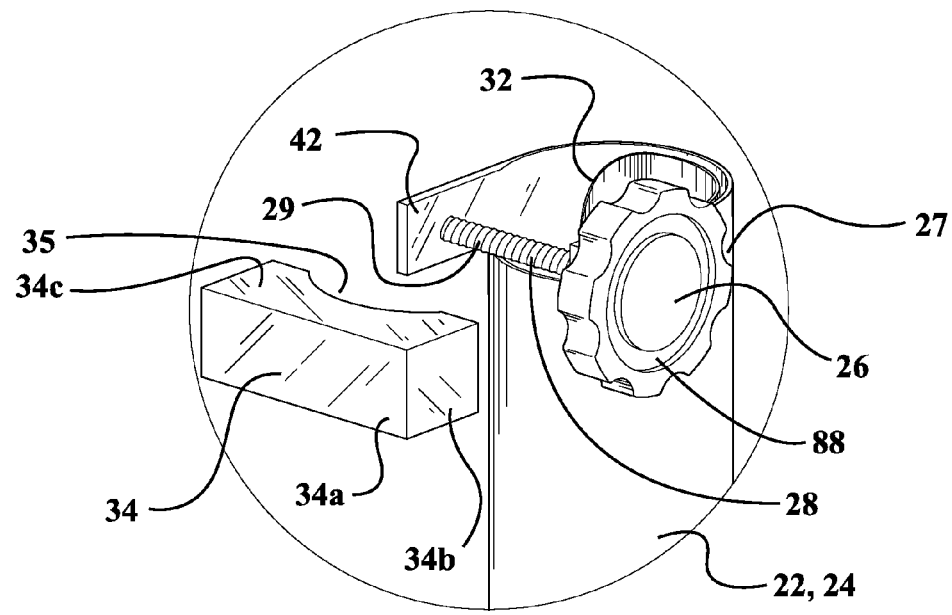
FIG. 7 is a partially exploded perspective view of the pole securement sleeve, according to an embodiment of the invention, wherein the clamping mechanism housing cover is shown separated from the other clamping mechanism components, and the clamping member is illustrated in a third position.

With particular reference to FIGS. 5-7 and 11A-13, the structure of each adjustment screw 28 and each U-shaped clamping member 32 of the clamping mechanisms 84 will be further explained. As best shown in FIGS. 5-7 and the enlarged sectional view of FIG. 11B, each adjustment screw 28 is provided with a plurality of external threads 29 along the axial length thereof. The shaft of each adjustment screw 28 is received within respective apertures 41, 43 of the first and second clamping mechanism support arms 40, 42. More particularly, each adjustment screw 28 is supported by support arms 40, 42 proximate to its longitudinally opposed ends (see FIGS. 11A-11B). The portions of the shaft of each adjustment screw 28 that contact the inner walls defining the support apertures 41, 43 are non-threaded so that the adjustment screw 28 may freely rotate within the apertures 41, 43. In order to retain each adjustment screw 28 in the support arms 40, 42, a washer 38 is affixed to the end portion of the adjustment screw 28 that is opposite to the squared end portion 28a that is attached to handle 26. In one exemplary embodiment, the washer 38 may be welded to the end of the adjustment screw 28. As illustrated in FIGS. 12 and 13, each U-shaped clamping member 32 has opposed first and second ends 32a, 32b. In order to accommodate the adjustment screw 28 passing therethrough, respective apertures 33 are provided in the U-shaped clamping member 32 proximate to each of its first and second ends 32a, 32b (see FIG. 13). The first end 32a of each U-shaped clamping member 32 is in a substantially fixed position relative to the clamping member adjustment means 26, 28 (i.e., the first end 32a of each U-shaped clamping member 32 is disposed in a fixed axial position along the length of the respective adjustment screw 28). In one exemplary embodiment, the first end 32a of each U-shaped clamping member 32 is affixed to the interior surface of the support arm 40 (e.g., by means of welding) such that the first end 32a of each U-shaped clamping member 32 is not displaced when the handle 26 and adjustment screw 28 are rotated by a user. In contrast, the second end 32b of each U-shaped clamping member 32 is adjustable relative to the clamping member adjustment means 26, 28 so as to increase or decrease the area 31 circumscribed by the adjustment screw 28 and the clamping member 32 (see FIG. 12). That is, as the handle 26 and adjustment screw 28 are rotated by a user, the plurality of external threads 29 on the shaft of the adjustment screw 28 matingly engage with a plurality of internal threads in the apertured boss 36, which is fixedly attached to the second end 32b of the U-shaped clamping member 32 (e.g., by welding). As such, when the handle 26 and adjustment screw 28 are rotated, the apertured boss 36 and the second end 32b of the U-shaped clamping member 32 are linearly translated along the threaded shaft of the adjustment screw 28.

In order to conceal the internal components 28, 32, 36, 38 of the clamping mechanisms 84, and to give the pole securement sleeve 20 a more finished appearance, each clamping mechanism 84 is provided with a housing member 34 that substantially covers the components 28, 36, 38. As best shown in FIGS. 5-7, the housing member 34 of each clamping mechanism 84 comprises a longitudinal transverse wall 34a, two opposed end walls 34b, a top wall 34c, and a bottom wall (not visible in FIGS. 5-7). It can be seen that opposed end walls 34b and top wall 34c are disposed generally perpendicular to the longitudinal transverse wall 34a. Also, opposed end walls 34b are disposed generally perpendicular to the top wall 34c. Also, as illustrated in the partially exploded perspective views of FIGS. 5-7, the top wall 34c of the housing member 34 is provided with a concave notch 35 formed therein for receiving a circular sidewall 78, 79 of either first tubular member section 22 or second tubular member section 24. In one exemplary embodiment, each housing member 34 is affixed to its respective tubular member section 22, 24 by welding it thereto.

Next, with particular reference to the partially exploded perspective views of FIGS. 5-7, the operation of the clamping mechanisms 84 will be described in detail. When a user wants to tighten one of the U-shaped clamping members 32 against the umbrella pole 82, he or she grasps, and turns the handle 26 of the clamping mechanism in a clockwise direction (as indicated by the curved arrow 76 in FIG. 1), which in turn, rotates the adjustment screw 28 in the same clockwise direction (because the handle 26 is affixed to the squared end 28a of the screw 28, the screw 28 rotates with the handle 26). When the adjustment screw 28 is rotated in a clockwise direction, the apertured boss 36, which is fixedly attached proximate to the second end 32b of the U-shaped clamping member 32, is linearly displaced along a longitudinal axis LA2 of the adjustment screw 28 of the clamping mechanism 84 (see FIG. 6) towards the first, fixed end 32a of the U-shaped clamping member 32. As the second end 32b of the U-shaped clamping member 32 is displaced towards the first, fixed end 32a of the U-shaped clamping member 32, the area 31 circumscribed by the adjustment screw 28 and the U-shaped clamping member 32 is gradually decreased in size, which results in an increased compressive force being applied to the outer periphery of the umbrella pole 82 (i.e., a tighter grip around the umbrella pole 82). In FIG. 5, the second, displaceable end 32b of the U-shaped clamping member 32 is shown in its furthest spaced-apart position from the first, fixed end 32a of the U-shaped clamping member 32, wherein the area 31 circumscribed by the adjustment screw 28 and the U-shaped clamping member 32 is maximized. In FIG. 6, an intermediate position of the second, displaceable end 32b of the U-shaped clamping member 32 is illustrated, wherein the second, displaceable end 32b lies closer to the first, fixed end 32a of the U-shaped clamping member 32, as compared to the position shown in FIG. 5. The area 31 circumscribed by the adjustment screw 28 and the U-shaped clamping member 32 in FIG. 6 is less than that of FIG. 5. In FIG. 7, the second, displaceable end 32b of the U-shaped clamping member 32 is shown in its closest position to that of the first, fixed end 32a of the U-shaped clamping member 32, wherein the area 31 circumscribed by the adjustment screw 28 and the U-shaped clamping member 32 is at a minimum.

Conversely, when a user wants to loosen one of the U-shaped clamping members 32 from contact with the umbrella pole 82, he or she grasps, and turns the handle 26 of the clamping mechanism in a counter-clockwise direction (as indicated by the curved arrow 77 in FIG. 1), which in turn, rotates the adjustment screw 28 in the same counter-clockwise direction (because the handle 26 is affixed to the squared end 28a of the screw 28, the screw 28 rotates with the handle 26). When the adjustment screw 28 is rotated in a counter-clockwise direction, the apertured boss 36, which is fixedly attached proximate to the second end 32b of the U-shaped clamping member 32, is linearly displaced along a longitudinal axis LA2 of the adjustment screw 28 of the clamping mechanism 84 (see FIG. 6) away from the first, fixed end 32a of the U-shaped clamping member 32. As the second end 32b of the U-shaped clamping member 32 is displaced away from the first, fixed end 32a of the U-shaped clamping member 32, the area 31 circumscribed by the adjustment screw 28 and the U-shaped clamping member 32 is gradually increased in size, which results in a decreased compressive force being applied to the outer periphery of the umbrella pole 82 (i.e., a tighter grip around the umbrella pole 82).

Figure 9:
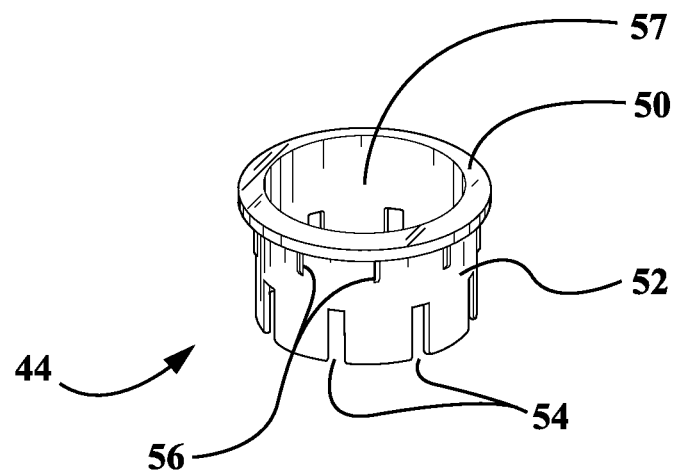
FIG. 9 is a perspective view of a first end cap member of the umbrella base assembly that is disposed at the top of the pole securement sleeve, according to an embodiment of the invention.

Initially, with reference to the exploded view of FIG. 13, it can be seen that the top end of the second tubular member section (i.e., upper tubular member 24) is preferably provided with a plurality of end cap members 44, 46 provided thereon. The detailed features of the lower end cap member 44 are illustrated in FIG. 9. As shown in this figure, the lower end cap member 44 generally comprises an upper collar portion 50 and a circular sidewall body portion 52. The upper collar portion 50, which is disposed at the upper end of the circular sidewall body portion 52, is in the form of a peripheral flange. The bottom surface of the flange-like collar portion 50 of the end cap member 44 is designed to rest on the top annular surface of the second tubular member section 24. As depicted in FIG. 9, the circular sidewall body portion 52 is provided with a plurality of axially extending notches 54 circumferentially spaced apart about its periphery. In addition, the circular sidewall body portion 52 of the lower end cap member 44 is also provided with a plurality of axially extending ribs 56 circumferentially spaced apart about its periphery. The axially extending ribs 56 are slightly angled inwardly in a downward direction such that the lower end cap member 44 can be received within the internal passageway 80 of the second tubular member section 24 in a friction-fit type engagement with the bounding internal sidewall surface thereof (i.e., the lower end cap member 44 frictionally engages the internal surface of the circular sidewall 79). Also, as shown in FIG. 9, the lower end cap member 44 is provided with a central aperture 57 extending therethrough in order to accommodate the upper end cap member 46 and/or the umbrella pole 82.

Figure 10:
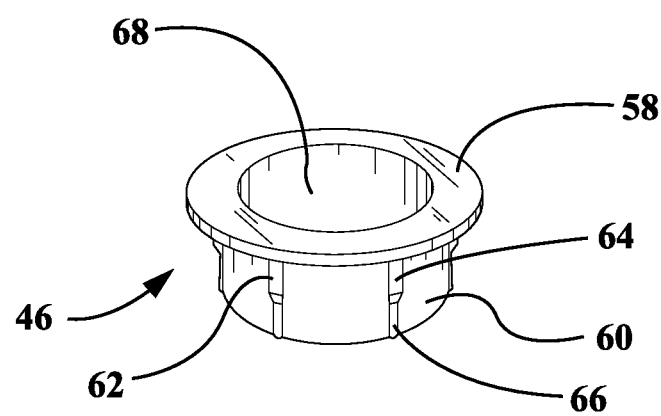
FIG. 10 is a perspective view of a second end cap member of the umbrella base assembly that is disposed at the top of the pole securement sleeve, according to an embodiment of the invention.

Now, referring to FIG. 10, the detailed features of the upper end cap member 46 will be described. As depicted in this figure, the upper end cap member 46 generally comprises an upper collar portion 58 and a circular sidewall body portion 60. The upper collar portion 58, which is disposed at the upper end of the circular sidewall body portion 60, is in the form of a peripheral flange. The bottom surface of the flange-like collar portion 58 of the end cap member 46 is designed to rest on the top surface of upper collar portion 50 of the lower end cap member 44. As depicted in FIG. 10, the circular sidewall body portion 60 is provided with a plurality of axially extending ribs 62 circumferentially spaced apart about its periphery. Each rib 62 has an upper rib portion 64 and a lower rib portion 66. In FIG. 10, it can be seen that each upper rib portion 64 of each rib 62 projects outwardly further than each lower rib portion 66 such that the upper end cap member 46 can be received within the central aperture 57 of the lower end cap member 44 in a friction-fit type engagement with the bounding internal sidewall surface thereof (i.e., the upper end cap member 46 frictionally engages the internal surface of the circular sidewall body portion 52 of the lower end cap member 44). Also, as shown in FIG. 10, the upper end cap member 46 is provided with a central aperture 68 extending therethrough in order to accommodate the umbrella pole 82.

It is readily apparent that the aforedescribed pole securement sleeve 20 and umbrella base assembly 100 offer numerous advantages. First, the pole securement sleeve 20 is capable of securely retaining a pole (e.g., umbrella pole 82) therein so as to effectively resist external forces acting on the pole. Secondly, a pole securement system is disclosed, which employs a pole securement sleeve 20, that is capable of exerting a substantial retaining force on the pole (e.g., umbrella pole 82) so as to ensure that it does not become disengaged from the securement sleeve 20. Finally, the pole securement sleeve 20 of the umbrella base assembly 100 is capable of exerting a force on the umbrella pole 82 which is sufficient to prevent the umbrella pole 82 from becoming separated from the umbrella base assembly 100.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A pole securement sleeve comprising, in combination:
   a tubular housing member having a sidewall defining an internal passageway, said internal passageway of said tubular housing member configured to receive a pole therein;
   a clamping member, a portion of said clamping member disposed in said internal passageway of said tubular housing member, said clamping member configured to apply a compressive force about a portion of an outer periphery of said pole;
   a clamping member adjustment means operatively coupled to said clamping member, said clamping member adjustment means together with said clamping member circumscribing an area configured to be intersected by said pole;
   a pair of spaced apart support arms extending from said sidewall of said tubular housing member, said pair of support arms supporting said clamping member adjustment means in a cantilevered manner from said sidewall of said tubular housing member;
   wherein, when a moment or torque is applied to said clamping member adjustment means, a size of said area circumscribed by said clamping member adjustment means and said clamping member is adjusted.

2. The pole securement sleeve according to claim 1, wherein said tubular housing member comprises a slot disposed in said sidewall thereof, said clamping member passing through said slot in said sidewall of said tubular housing member.

3. The pole securement sleeve according to claim 1, wherein said clamping member is in the form of a U-shaped member, said U-shaped member having a first end and a second end, said first end of said U-shaped member being in a substantially fixed position relative to said clamping member adjustment means, and said second end of said U-shaped member being adjustable relative to said clamping member adjustment means so as to increase or decrease said area circumscribed by said clamping member adjustment means and said clamping member.

4. The pole securement sleeve according to claim 3, wherein said second end of said U-shaped member is linearly displaceable along a longitudinal axis of said clamping member adjustment means.

5. The pole securement sleeve according to claim 1, wherein said clamping member adjustment means comprises a screw having a plurality of external threads that matingly engage with a plurality of internal threads of said clamping member.

6. The pole securement sleeve according to claim 5, wherein said clamping member adjustment means further comprises a handle portion, said handle portion coupled to an end portion of said screw.

7. The pole securement sleeve according to claim 1, further comprising a housing member substantially covering said clamping member adjustment means.

8. The pole securement sleeve according to claim 1, wherein said clamping member adjustment means has a longitudinal axis, and wherein at least one of said pair of spaced apart support arms is disposed transversely relative to said longitudinal axis of said clamping member adjustment means.

9. A pole securement system comprising, in combination:
   a pole having a first end portion and a second end portion, said second end portion of said pole disposed opposite to said first end portion;
   a tubular housing member having a sidewall defining an internal passageway, said internal passageway of said tubular housing member configured to receive said first end portion of said pole therein; said tubular housing member further including a first tubular member section and a second tubular member section, said second tubular member section comprising an end portion with a plurality of external threads disposed thereon, said plurality of external threads on said end portion of said second tubular member section configured to engage with an internal surface of an end portion of said first tubular member section; and
   a pair of clamping mechanisms coupled to said tubular housing member, a first of said pair of said clamping mechanisms axially spaced apart from a second of said pair of said clamping mechanisms along a length of said tubular housing member, and each of said pair of clamping mechanisms including:
      a clamping member, a portion of said clamping member disposed in said internal passageway of said tubular housing member, said clamping member configured to apply a compressive force about a portion of an outer periphery of said pole; and
      a clamping member adjustment means operatively coupled to said clamping member, said clamping member adjustment means together with said clamping member circumscribing an area intersected by said pole;
   wherein, when a moment or torque is applied to said clamping member adjustment means, a size of said area circumscribed by said clamping member adjustment means and said clamping member is adjusted, and a compressive force is applied to said portion of said outer periphery of said pole.

10. The pole securement system according to claim 9, wherein said first of said pair of said clamping mechanisms is coupled to said first tubular member section, and said second of said pair of said clamping mechanisms is coupled to said second tubular member section.

11. The pole securement system according to claim 9, further comprising at least one pair of spaced apart support arms extending from said sidewall of said tubular housing member, said at least one pair of support arms supporting said clamping member adjustment means of one of said pair of said clamping mechanisms in a cantilevered manner from said sidewall of said tubular housing member.

12. An umbrella base assembly configured to support an umbrella pole in an upright position, said umbrella base assembly comprising:
   an umbrella base member;
   a pole securement sleeve coupled to said umbrella base member, said pole securement sleeve including:
      a tubular housing member having a sidewall defining an internal passageway, said internal passageway of said tubular housing member configured to receive an umbrella pole therein;
      a clamping member, a portion of said clamping member disposed in said internal passageway of said tubular housing member, said clamping member configured to apply a compressive force about a portion of an outer periphery of said umbrella pole;

a clamping member adjustment means operatively coupled to said clamping member, said clamping member adjustment means together with said clamping member circumscribing an area configured to be intersected by said umbrella pole;

at least one support member extending outwardly from said sidewall of said tubular housing member, said at least one support member supporting said clamping member adjustment means in a cantilevered manner from said sidewall of said tubular housing member;

wherein, when a moment or torque is applied to said clamping member adjustment means, a size of said area circumscribed by said clamping member adjustment means and said clamping member is adjusted.

13. The umbrella base assembly according to claim 12, wherein said umbrella base member is coupled to said pole securement sleeve by a removable fastener.

14. The umbrella base assembly according to claim 12, wherein said pole securement sleeve further comprises one or more end cap members, said one or more end cap members configured to be received within an upper end portion of said tubular housing member.

15. The umbrella base assembly according to claim 12, wherein said at least one support member of said pole securement sleeve further comprises a pair of spaced apart support arms extending from said sidewall of said tubular housing member, each of said pair of support arms supporting said clamping member adjustment means in a cantilevered manner from said sidewall of said tubular housing member.

16. The umbrella base assembly according to claim 12, wherein said clamping member is in the form of a U-shaped member, said U-shaped member having a first end and a second end, said first end of said U-shaped member being in a substantially fixed position relative to said clamping member adjustment means, and said second end of said U-shaped member being adjustable relative to said clamping member adjustment means so as to increase or decrease said area circumscribed by said clamping member adjustment means and said clamping member.

17. The umbrella base assembly according to claim 16, wherein said second end of said U-shaped member is linearly displaceable along a longitudinal axis of said clamping member adjustment means.

18. The umbrella base assembly according to claim 12, wherein said clamping member adjustment means comprises a screw having a plurality of external threads that matingly engage with a plurality of internal threads of said clamping member.

19. The umbrella base assembly according to claim 18, wherein said clamping member adjustment means further comprises a handle portion, said handle portion coupled to an end portion of said screw.

20. The umbrella base assembly according to claim 12, wherein said clamping member adjustment means has a longitudinal axis, and wherein said at least one support member is disposed transversely relative to said longitudinal axis of said clamping member adjustment means.

* * * * *